US012297966B2

(12) United States Patent
Shao et al.

(10) Patent No.: US 12,297,966 B2
(45) Date of Patent: May 13, 2025

(54) METHODS AND SYSTEMS FOR SAFE MAINTENANCE OF UNDERGROUND PIPELINE CORRIDOR BASED ON SMART GAS REGULATORY INTERNET OF THINGS

(71) Applicant: CHENGDU QINCHUAN IOT TECHNOLOGY CO., LTD., Sichuan (CN)

(72) Inventors: Zehua Shao, Chengdu (CN); Bin Liu, Chengdu (CN); Yuefei Wu, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/784,896

(22) Filed: Jul. 25, 2024

(65) Prior Publication Data
US 2024/0375289 A1  Nov. 14, 2024

(30) Foreign Application Priority Data
Jun. 21, 2024  (CN) .......................... 202410804935.9

(51) Int. Cl.
*F17D 5/00* (2006.01)
*B25J 9/16* (2006.01)
(Continued)

(52) U.S. Cl.
CPC ............ *F17D 5/005* (2013.01); *B25J 9/1679* (2013.01); *G06Q 50/26* (2013.01); *G16Y 10/35* (2020.01); *G16Y 40/10* (2020.01); *G16Y 40/50* (2020.01)

(58) Field of Classification Search
CPC ........ G06Q 50/06; G06Q 50/26; G06Q 10/20; G16Y 10/35; G16Y 40/10; G16Y 40/20;
(Continued)

(56) References Cited

U.S. PATENT DOCUMENTS

| 2023/0075722 | A1 | 3/2023 | Shao et al. |
| 2023/0083626 | A1* | 3/2023 | Shao ...................... G06N 20/00 701/2 |
| 2024/0346461 | A1* | 10/2024 | Shao .................. G05B 19/4155 |

FOREIGN PATENT DOCUMENTS

| CN | 206568169 U | 10/2017 |
| CN | 110187665 A | 8/2019 |

(Continued)

OTHER PUBLICATIONS

Notification to Grant Patent Right for Invention in Chinese Application No. 202410804935.9 mailed on Aug. 22, 2024, 4 pages.
(Continued)

*Primary Examiner* — Spencer D Patton
(74) *Attorney, Agent, or Firm* — METIS IP LLC

(57) ABSTRACT

A method and system for safe maintenance of an underground pipeline corridor based on a smart gas regulatory IoT. The method is executed by a gas company management platform of a system for safe maintenance of the underground pipeline corridor based on the smart gas regulatory IoT, and the method includes: determining, based on a safety factor of an inspection region, a mandatory machine inspection region; generating regional planning data based on the mandatory machine inspection region, and the region inspection type of the remaining region; determining a target pipeline corridor region and an inspection instruction based on the regional planning data; determining, based on the safety factor and/or a regional importance degree of the inspection region, a monitoring frequency of an environmental monitoring device and a supervisory equipment in the inspection region, and adjusting the monitoring frequency based on a corresponding control instruction.

8 Claims, 4 Drawing Sheets

(51) Int. Cl.
*G06Q 50/06* (2024.01)
*G06Q 50/26* (2012.01)
*G16Y 10/35* (2020.01)
*G16Y 40/10* (2020.01)
*G16Y 40/50* (2020.01)

(58) Field of Classification Search
CPC ........ G16Y 40/35; G16Y 40/40; G16Y 40/50; F17D 5/00; F17D 5/08; F17D 5/005; F16L 2101/30
See application file for complete search history.

(56) References Cited

FOREIGN PATENT DOCUMENTS

| | | |
|---|---|---|
| CN | 210233046 U | 4/2020 |
| CN | 114255521 A | 3/2022 |
| CN | 117517583 A | 2/2024 |
| CN | 118101721 A | 5/2024 |

OTHER PUBLICATIONS

First Office Action in Chinese Application No. 202410804935.9 mailed on Aug. 1, 2024, 29 pages.

\* cited by examiner

METHODS AND SYSTEMS FOR SAFE MAINTENANCE OF UNDERGROUND PIPELINE CORRIDOR BASED ON SMART GAS REGULATORY INTERNET OF THINGS

CROSS-REFERENCE TO RELATED APPLICATION

This application claims priority of Chinese Patent Application No. 202410804935.9 filed on Jun. 21, 2024, the contents of which are entirely incorporated herein by reference.

TECHNICAL FIELD

The present disclosure relates to the field of smart gas, and in particular relates to a method and system for safe maintenance of an underground pipeline corridor based on smart gas regulatory Internet of Things.

BACKGROUND

The use of natural gas as a clean energy source may be an important part of people's industrial production and daily life. An underground pipeline corridor may integrate electric power, gas, water supply and drainage and other kinds of pipelines in one. To ensure a safety of the underground pipeline corridor and a normal use of the underground pipeline corridors, it may be necessary to carry out reasonable inspection and maintenance of the underground pipeline corridor.

However, the underground pipeline corridor may be located in a complex environment and may be susceptible to effects of a road construction, a site excavation, etc. To avoid possible dangers, it may be necessary to combine a manual inspection and a robotic inspection for a safety maintenance. However, as the underground pipeline corridor is in a closed environment, regional restrictions and safety risks may be posed for inspectors to enter the underground pipeline corridor for repair and maintenance work.

Therefore, it is desired to provide a method and system for safe maintenance of an underground pipeline corridor based on the smart gas regulatory Internet of Things. A reasonable inspection process may be determined when conducting inspections of the underground pipeline corridor. As a result, while considering safety of the inspections, and at the same time, the effectiveness of the inspection may be improved, and a risk may be reduced.

SUMMARY

One or more embodiments of the present disclosure provide a method for safe maintenance of an underground pipeline corridor based on smart gas regulatory Internet of Things (IoT). The method may be executed by a gas company management platform of a system for safe maintenance of an underground pipeline corridor based on a smart gas regulatory IoT, and the method includes: obtaining, through a data storage center, an inspection region of an underground pipeline corridor, region position data, region information data, and a historical inspection record corresponding to the inspection region; obtaining, from a gas equipment object platform, environmental monitoring data, image data, and gas monitoring data of the inspection region via a gas company sensor network platform; obtaining, through a government regulatory management platform, population data; determining a safety factor for the inspection region based on the environmental monitoring data, the image data, the gas monitoring data, and the region position data; determining, based on the safety factor, a mandatory machine inspection region in the inspection region; determining a region inspection type of a remaining region in the inspection region based on the region information data, the historical inspection record, and the population data, the region inspection type including a robotic inspection and a manual inspection; generating regional planning data based on the mandatory machine inspection region, and the region inspection type of the remaining region; determining a target pipeline corridor region and an inspection instruction based on the regional planning data, and send the target pipeline corridor region and the inspection instruction to the inspection robot; and determining, based on the safety factor and/or a regional importance degree of the inspection region, a monitoring frequency of an environmental monitoring device and a supervisory equipment in the inspection region through a preset algorithm, and sending a control instruction corresponding to the monitoring frequency through the gas company sensor network platform to the gas equipment object platform. The gas equipment object platform adjusts the monitoring frequency based on the control instruction.

One of the embodiments of the present disclosure provides a system for safe maintenance of an underground pipeline corridor based on a smart gas regulatory IoT. The system includes a government regulatory management platform, a government regulatory sensor network platform, a government regulatory object platform, a gas company sensor network platform and a gas equipment object platform; the government regulatory management platform includes a government gas regulatory management platform and a government safety regulatory management platform; the government regulatory sensor network platform includes a government gas regulatory sensor network platform and a government safety regulatory sensor network platform; the government regulatory object platform includes a gas company management platform, and the gas company management platform is configured to perform the method for safe maintenance of an underground pipeline corridor based on a smart gas regulatory IoT.

One or more embodiments of the present disclosure provide a non-transitory computer-readable storage medium storing computer instructions, and when reading the computer instructions in the storage medium, a computer implements the method for safe maintenance of an underground pipeline corridor based on a smart gas regulatory IoT.

BRIEF DESCRIPTION OF THE DRAWINGS

The present disclosure will be further illustrated by way of exemplary embodiments, which will be described in detail with reference to the accompanying drawings. These embodiments are not limiting, and in these embodiments, the same counting denotes the same structure, wherein.

DETAILED DESCRIPTION

Figure 1:
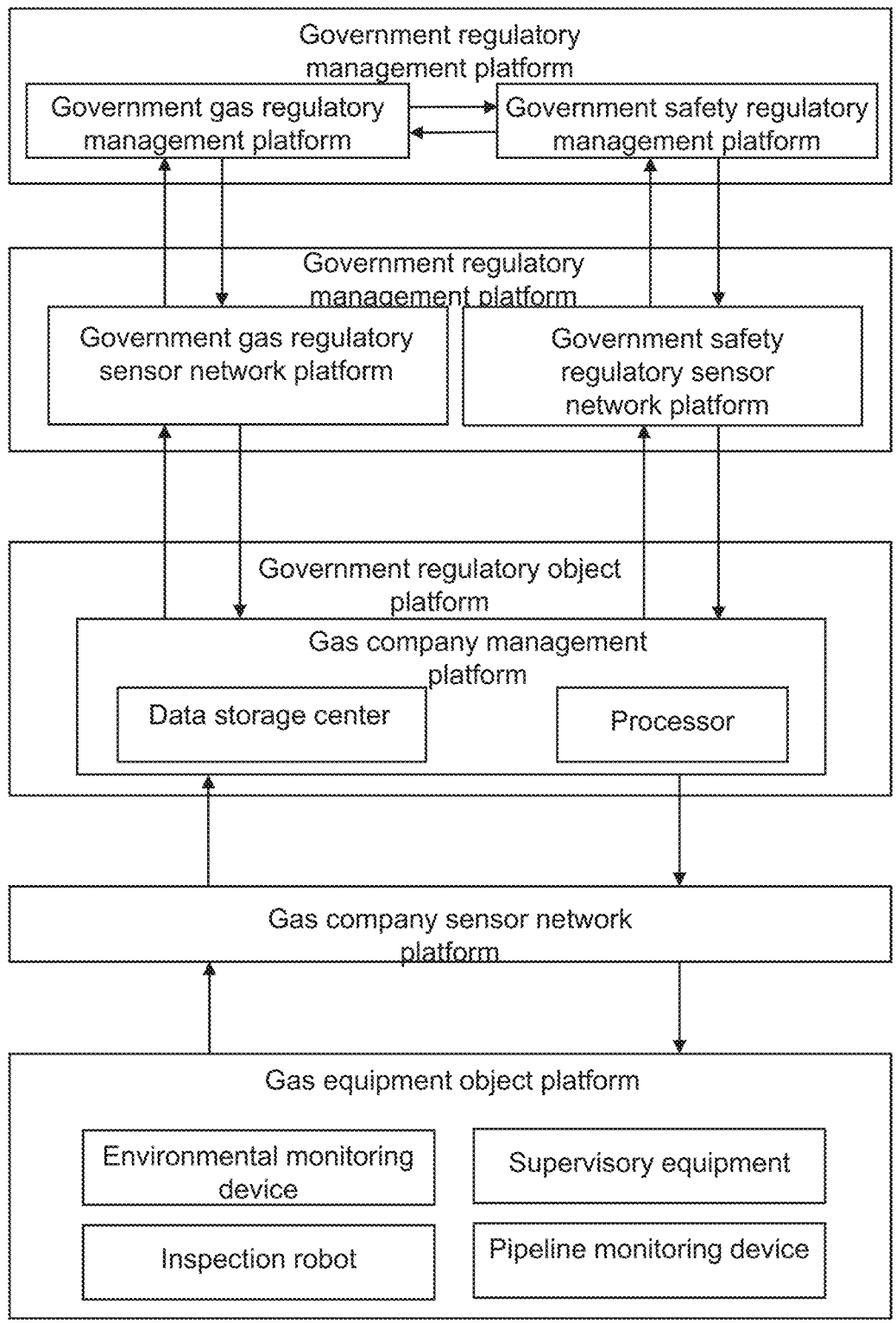
FIG. 1 is a schematic diagram illustrating a platform structure of a system for safe maintenance of an underground pipeline corridor based on smart gas regulatory Internet of Things (IoT) according to some embodiments according to the present disclosure.

To more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for those skilled in the art to apply the present disclosure to other similar scenarios in accordance with these drawings without creative labor. The present disclosure may be applied to other similar scenarios based on these drawings without creative labor. Unless obviously obtained from the context or the context illustrates otherwise, the same numeral in the drawings refers to the same structure or operation.

It should be understood that the terms "system," "device," "unit" and/or "module" as used herein are a way to distinguish between different components, elements, parts, sections or assemblies at different levels. However, these words may be replaced by other expressions if other words accomplish the same purpose.

Flowcharts are used in the present disclosure to illustrate operations performed by a system in accordance with embodiments of the present disclosure. It should be appreciated that the preceding or following operations are not necessarily performed in an exact sequence. Instead, the operations can be processed in reverse order or simultaneously. Also, it is possible to add other operations to these processes or remove an operation or operations from them.

FIG. 1 is a schematic diagram illustrating a platform structure of a system for safe maintenance of an underground pipeline corridor based on a smart gas regulatory Internet of Things (IoT) according to some embodiments according to the present disclosure.

As shown in FIG. 1, the system for safe maintenance of an underground pipeline corridor based on a smart gas regulatory IoT (hereinafter referred to as an IoT system 100) may include a government regulatory management platform, a government regulatory sensor network platform, a government regulatory object platform, a gas company sensor network platform, and a gas equipment object platform.

The government regulatory management platform refers to a comprehensive management platform for government regulatory information. In some embodiments, the government regulatory management platform may be configured for data processing and storage of the IoT system 100.

In some embodiments, the government regulatory management platform may include a government gas regulatory management platform and a government safety regulatory management platform. The government gas regulatory management platform may interact with the government safety regulatory management platform, e.g., by transmitting data in both directions.

In some embodiments, the government regulatory management platform may interact with the government regulatory sensor network platform. For example, the government regulatory management platform may send a data instruction to a gas company management platform through the government regulatory sensor network platform to obtain inspection data.

The government regulatory sensor network platform refers to a platform for a comprehensive management of government sensor information. In some embodiments, the government regulatory sensor network platform may include a government gas regulatory sensor network platform and a government safety regulatory sensor network platform.

In some embodiments, the government regulatory sensor network platform may interact with the government regulatory management platform and a government regulatory object platform.

The government regulatory object platform refers to the platform for government regulatory information generation and information execution control. In some embodiments, the government regulatory object platform may include a gas company management platform.

In some embodiments, the gas company management platform may include a data storage center with a processor. In some embodiments, the data storage center may be used to store and manage all operational information of the IoT system 100. In some embodiments, the data storage center may be configured as an obtaining and/or storage equipment for obtaining and/or storing data related to a region, a monitoring, etc. The gas company management platform may read data from the data storage center based on actual needs.

In some embodiments, the processor may process information and/or data related to the IoT system 100 to perform one or more of the functions described in the present disclosure. For example, the processor may determine a target pipeline corridor region and an inspection instruction based on regional planning data, and control an inspection robot to perform an inspection on the target pipeline corridor region based on the inspection instruction. For another example, the processor may determine a monitoring frequency, and send the control instruction to the gas equipment object platform via the gas company sensor network platform.

In some embodiments, the gas company management platform may be a platform that integrates and coordinates linkage and collaboration between various functional platforms, aggregates all the information of the IoT, and provides perception management and control management functions for the IoT operation system. More descriptions of functionality of the gas company management platform can be found in the related descriptions of FIG. 2-FIG. 4.

The gas company sensor network platform refers to a platform for the comprehensive management of the sensor information of the gas company. The gas company sensor network platform may interact with the gas equipment object platform and the gas company management platform in both directions. For example, the gas company sensor network platform may upload the inspection data, environmental monitoring data, etc. received from the gas equipment object platform to the gas company management platform.

The gas equipment object platform refers to a functional platform for sensor information generation and controlling information execution.

In some embodiments, the gas equipment object platform may include an environmental monitoring device, a supervisory equipment, an inspection robot, and a pipeline monitoring device. The environmental monitoring device refers to a device for monitoring environment-related information.

The supervisory equipment refers to an equipment used to monitor an inspection region. The inspection robot refers to a robot with an inspection function. The pipeline monitoring device refers to a related device used to monitor a gas pipeline.

In some embodiments, the environmental monitoring device may be deployed in the underground pipeline corridor, and may be configured to obtain environmental monitoring data and upload the environmental monitoring data to the gas company sensor network platform via the gas equipment object platform. The environmental monitoring device may include at least a temperature sensor, an air sensor, and a dust sensor, which are used for obtaining a temperature, an air composition, and dust content data, respectively, for the inspection region.

In some embodiments, the supervisory equipment may be deployed in the underground pipeline corridor, and may be configured to obtain image data and upload the image data to the gas company sensor network platform via the gas equipment object platform. The supervisory equipment may include a monitoring and recording device.

In some embodiments, the pipeline monitoring device may be deployed within the gas pipeline, and may be configured to obtain gas monitoring data, and upload the gas monitoring data to the gas company sensor network platform via the gas equipment object platform. The pipeline monitoring device may include a flow rate monitoring device, a temperature sensor, a pressure sensor, etc., which are respectively used to obtain an air flow rate, the temperature, and pressure data within the gas pipeline.

In some embodiments, the inspection robot may be deployed in the underground pipeline corridor, and may be configured to perform an inspection and collect inspection data within the underground pipeline corridor, and upload the inspection data to the gas company sensor network platform. The inspection robot may include a robot body, a data collection device, etc. The data collection device may include a gas detection device, a dust monitoring device, a partial discharge detector, and an optical camera, an infrared camera, etc., which are respectively used to obtain different inspection data in the inspection region.

In some embodiments, the IoT system 100 may also include a multi-level network, such as a primary network and a secondary network. For example, the primary network may include a smart gas primary network management platform, a smart gas primary network sensor network platform, and a smart gas primary network object platform. For another example, the secondary network may include a smart gas secondary network management platform, a smart gas secondary network sensing network platform, and a smart gas secondary network object platform.

The various platforms in the aforementioned IoT system 100 may correspond to different functions in different levels of the network. For example, the government regulatory object platform may realize a function of the object platform when it is in the primary network, and when the government regulatory object platform is in the secondary network, the gas company management platform included in the government regulatory object platform may realize the management function, etc.

Based on the IoT system 100, gas operation and regulatory information may form a closed loop between the various functional platforms, and may be coordinated and operated regularly, thereby realizing informatization and intelligence of the safety maintenance monitoring of the smart gas underground pipeline corridor.

Figure 2:
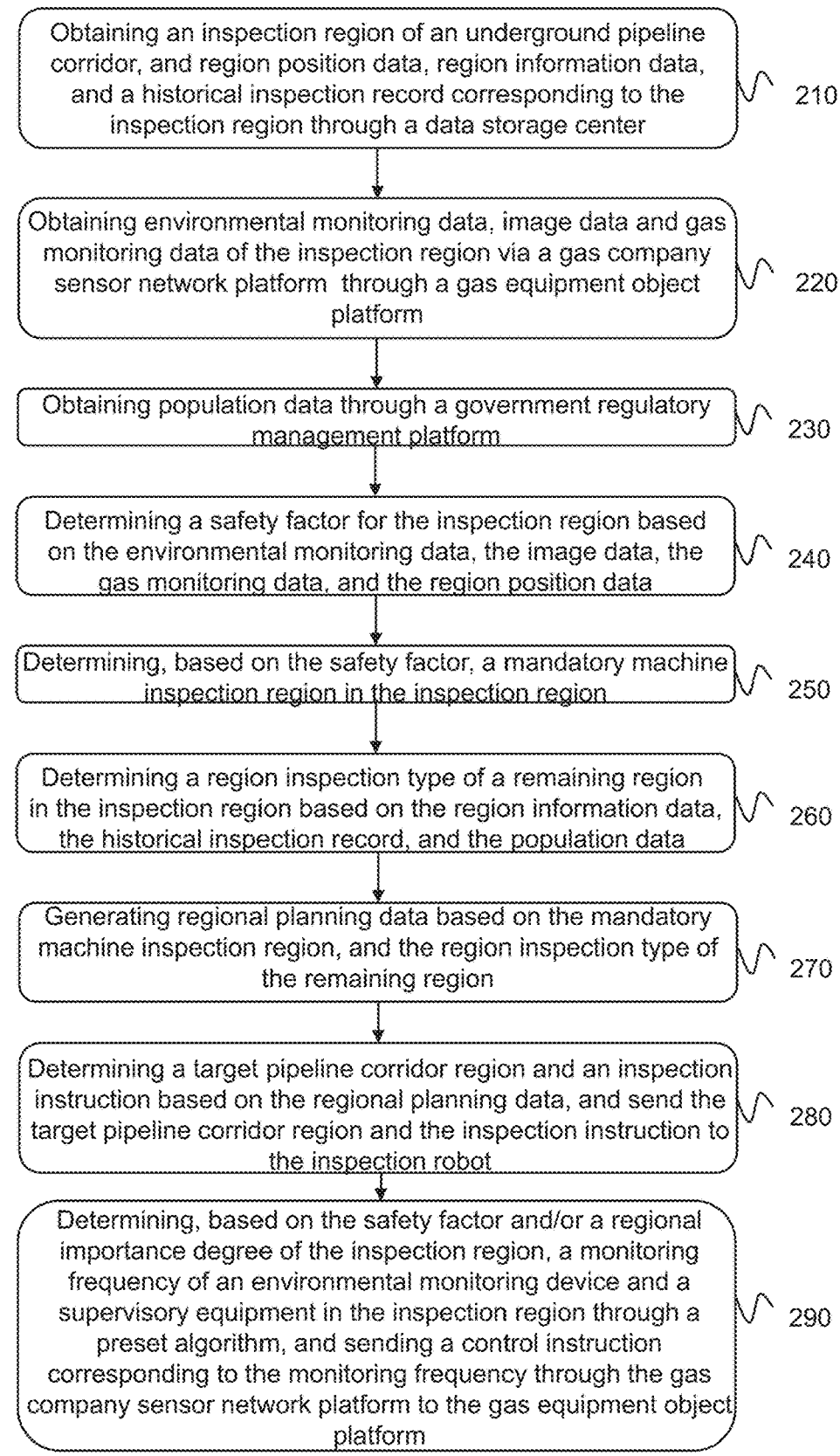
FIG. 2 is a flowchart illustrating an exemplary process for safe maintenance of an underground pipeline corridor based on smart gas regulatory IoT according to some embodiments of the present disclosure.
Figure 3:
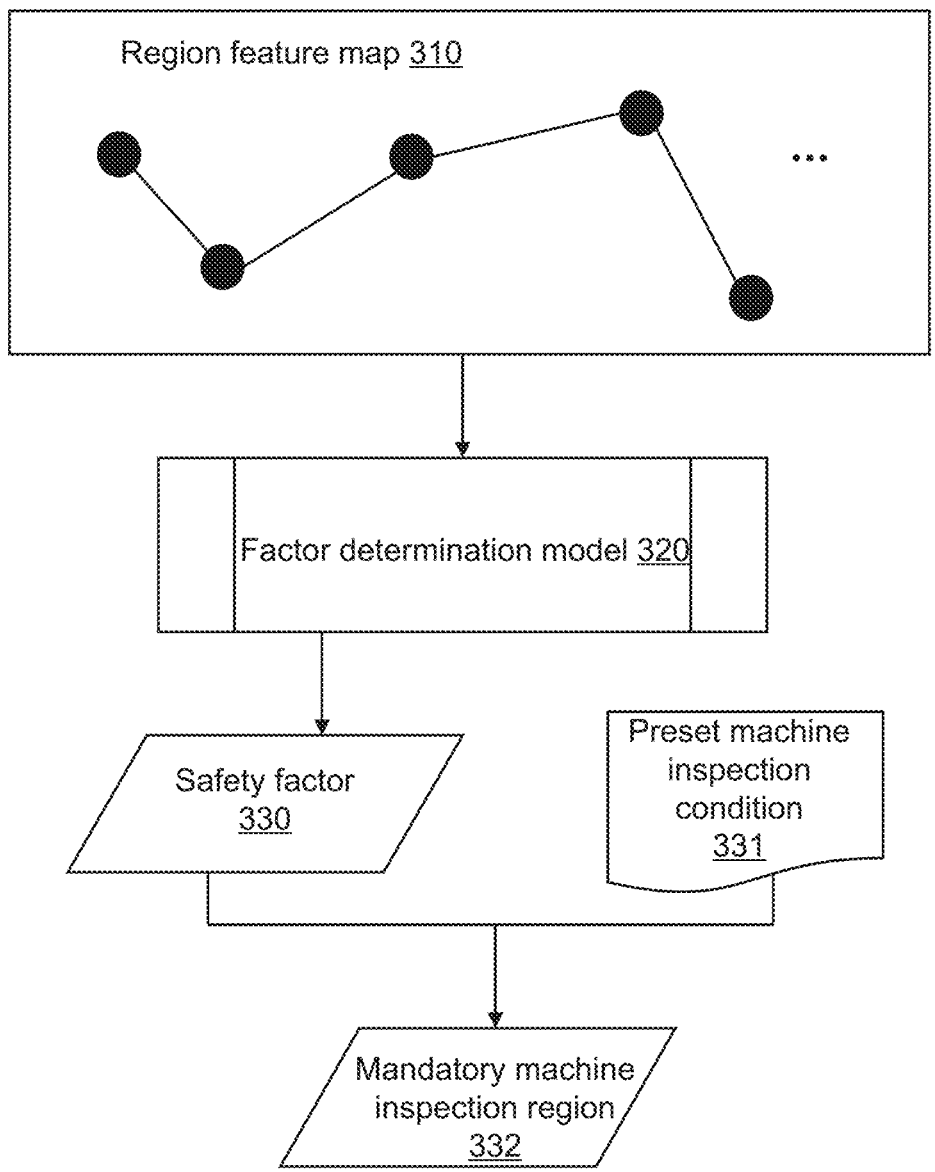
FIG. 3 is a schematic diagram illustrating an exemplary process for determining the mandatory machine inspection region according to some embodiments of the present disclosure.
Figure 4:
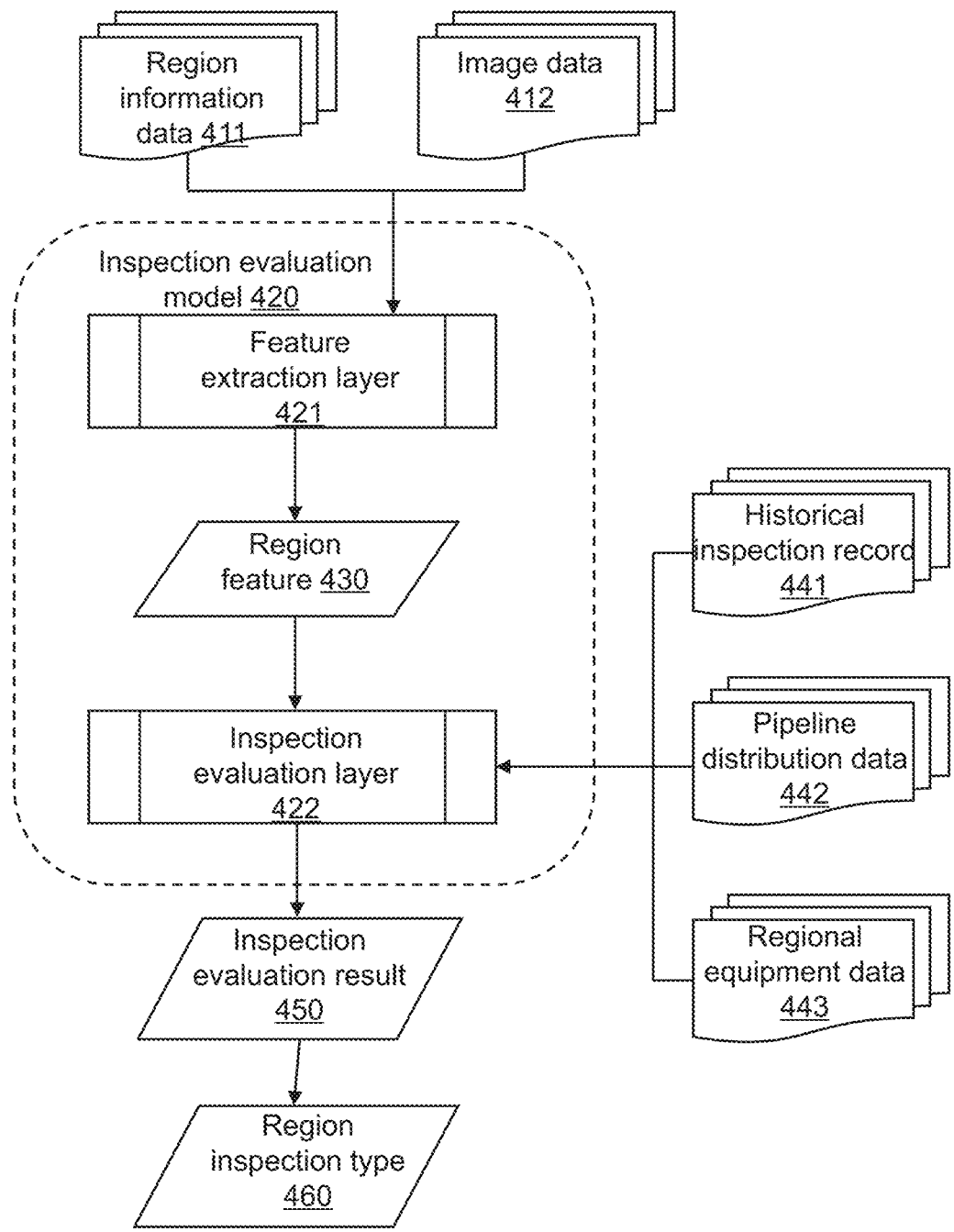
FIG. 4 is a schematic diagram illustrating an exemplary inspection evaluation model according to some embodiments of the present disclosure.

For detailed descriptions of the above, please refer to the descriptions of FIG. 2-FIG. 4.

It should be noted that the above description of the system for safe maintenance of an underground pipeline corridor based on the smart gas regulatory IoT is only for the convenience of description, and does not limit the present disclosure to the scope of the cited embodiments.

FIG. 2 is a flowchart illustrating an exemplary method for safe maintenance of an underground pipeline corridor based on a smart gas regulatory IoT according to some embodiments of the present disclosure. As shown in FIG. 2, a process 200 may include the following operations. In some embodiments, the process 200 may be performed by a gas company management platform.

In 210, obtaining an inspection region of an underground pipeline corridor, and region position data, region information data, and a historical inspection record corresponding to the inspection region through a data storage center.

For descriptions of the data storage center, please refer to FIG. 1.

The inspection region refers to a region in the underground pipeline corridor that needs to be inspected. The underground pipeline corridor may be divided into a plurality of inspection regions. At least one of the inspection regions may be preset manually. For example, the underground pipeline corridor may be divided into a pipeline one region, an equipment one region, a construction region, etc.

The region position data refers to relevant data reflecting a position of each inspection region. The region information data refers to relevant data that reflects the information of each inspection region. For example, the region information data may include a dimension, an area, a spatial shape, etc. of the each inspection region.

The historical inspection record refers to a record related to a historical inspection result. For example, the historical inspection record may include a record of problems, a record of repairs, a record of a count of historical inspections, etc.

In some embodiments, the gas company management platform may obtain pre-stored inspection regions of the underground pipeline corridor, as well as the region position data, the region information data, and the historical inspection record corresponding to each inspection region, through a data storage center.

In 220, obtaining environmental monitoring data, image data and gas monitoring data of the inspection region via a gas company sensor network platform through a gas equipment object platform.

For descriptions of the gas company sensor network platform and the gas equipment object platform, please refer to FIG. 1.

The environmental monitoring data refers to relevant monitoring data reflecting the environment of each inspection region. For example, the environmental monitoring data may include at least one of environmental temperature data, air composition data, and dust content data of the each inspection region. The environmental monitoring data may be obtained by the environmental monitoring device. For descriptions of the environmental monitoring device, please refer to FIG. 1.

The image data refers to data of relevant images taken in the inspection region. The image data may be captured and obtained by the supervisory equipment in the inspection region. For descriptions of the supervisory equipment, please refer to FIG. 1.

The gas monitoring data refers to monitoring data related to gas in the gas pipeline in the inspection region. For example, the gas monitoring data may include data such as a gas flow rate, a temperature, a pressure, etc. in the gas pipeline of the respective inspection region. The gas monitoring data may be obtained by the pipeline monitoring device. For description of the pipeline monitoring device, please refer to FIG. 1.

In some embodiments, the gas company management platform may obtain the environmental monitoring data, the image data, and the gas monitoring data of the inspection region via the gas company sensor network platform through the gas equipment object platform.

In 230, obtaining population data through a government regulatory management platform.

For related descriptions of the government regulatory management platform, please refer to FIG. 1. The population data refers to a population living in each inspection region. The gas company management platform may obtain the population data of each inspection region through the government regulatory management platform.

In 240, determining a safety factor for the inspection region based on the environmental monitoring data, the image data, the gas monitoring data, and the region position data.

The safety factor refers to a factor reflecting a level of safety in the inspection region. In some embodiments, the gas company management platform may determine the safety factor of the inspection region in various ways based on the environmental monitoring data, the image data, the gas monitoring data, and the region position data. For example, the gas company management platform may determine a corresponding safety factor by querying a preset table. The preset table may include a correspondence between the environmental monitoring data, the image data, the gas monitoring data, the region position data, and the safety factor. For example, the more spacious the inspection region, the more stable the gas monitoring data, and the closer the region is to the emergency exit, the higher the safety factor.

In some embodiments, the gas company management platform may also determine the safety factor through a factor determination model. More descriptions can be found in FIG. 3.

In 250, determining, based on the safety factor, a mandatory machine inspection region in the inspection region.

The mandatory machine inspection region refers to one or more inspection regions that need to be inspected by the robot. The mandatory machine inspection region may correspond to a region inspection type of a robotic inspection. More descriptions of the region inspection type and the robotic inspection can be found in descriptions of operation 260 below.

In some embodiments, the gas company management platform may determine the mandatory machine inspection region in the inspection region in various ways. For example, the gas company management platform may directly determine a region whose spatial volume is less than a volume threshold, or whose shortest distance from the emergency exit is greater than a distance threshold, as the mandatory machine inspection region. The volume threshold and the distance threshold may be preset manually.

In some embodiments, the gas company management platform may determine the mandatory machine inspection region based on the safety factor and a preset machine inspection condition, which are described in FIG. 3.

In 260, determining a region inspection type of a remaining region in the inspection region based on the region information data, the historical inspection record, and the population data.

The remaining region refers to the inspection region other than the mandatory machine inspection region.

The region inspection type refers to a type of division of labor when the inspection region is inspected. In some embodiments, the region inspection type may include robotic inspection and manual inspection. The region inspection type may also include a comprehensive inspection.

The robotic inspection refers to the inspection type of one or more inspection regions in the remaining region that need to be inspected by the robot. The manual inspection refers to the inspection type corresponding to one or more inspection regions in the remaining region that require the inspection manually. The comprehensive inspection refers to the inspection type corresponding to one or more inspection regions that need to be inspected by both the robot and manual labor together. The inspection region whose region inspection type is comprehensive inspection may be a comprehensive region.

In some embodiments, the gas company management platform may determine the region inspection type of the remaining region in the inspection region in various ways based on the region information data, the historical inspection record, and the population data. For example, the gas company management platform may construct a first vector database based on a first reference vector and the corresponding region inspection type, and, by matching the first feature vector, determine the region inspection type corresponding to the matched reference vector as the region inspection type of the remaining region.

The first feature vector refers to a vector to be matched and may be generated based on the region information data, the historical inspection record, and the population data of the current inspection region. The first reference vector may be generated from the region information data, the historical inspection record, and the population data of the historical record, and the corresponding region inspection type of the first reference vector may be the inspection type actually adopted in history.

In some embodiments, the gas company management platform may also determine the region inspection type of the remaining region based on an inspection evaluation model, as described in FIG. 4 and the corresponding descriptions.

In 270, generating regional planning data based on the mandatory machine inspection region, and the region inspection type of the remaining region.

The regional planning data refers to the planning data for the region inspection type of the inspection region. For example, the regional planning data may be represented as a vector group in a one-to-one correspondence with the inspection region and the region inspection type.

In some embodiments, the gas company management platform may generate the vector group as described above directly based on the mandatory machine inspection region and the region inspection type of the remaining region, and use the vector group as the regional planning data.

In 280, determining a target pipeline corridor region and an inspection instruction based on the regional planning data, and send the target pipeline corridor region and the inspection instruction to the inspection robot.

The target pipeline corridor region refers to the inspection region that needs to be inspected by the robot. For example, the target pipeline corridor region may include the remaining region that requires the robotic inspection (including the comprehensive region) or the mandatory machine inspection region. More descriptions of the inspection robot can be found in FIG. 1.

The inspection instruction refers to a relevant instruction used to instruct the robotic inspection. In some embodiments, the inspection instruction may include an inspection route for the robot. The inspection route may be determined by a route planning algorithm. For example, the route planning algorithm may include at least one of a graph search method, a fast-expanding random tree algorithm, an artificial potential field method, or an obstacle avoidance planning algorithm, etc.

In some embodiments, the gas company management platform and/or the processor in the gas company management platform may determine the target pipeline corridor region and the inspection instruction based on the regional planning data in various ways, the target pipeline corridor region and the inspection instruction to the inspection robot. For example, the gas company management platform and/or the processor in the gas company management platform may determine the remaining region other than the mandatory machine inspection region, and the robotic inspection (including the comprehensive area) in the regional planning data as the target pipeline corridor region. Further, the gas company management platform and/or the processor in the gas company management platform may generate the inspection instruction based on the target pipeline corridor region in combination with the route planning algorithm and send the inspection instruction to the inspection robot.

In some embodiments, the processor may send, based on the regional planning data, send the inspection region determined to be the manual inspection region to corresponding inspection personnel via a terminal so that the personnel conduct the inspection based on the regional planning data.

In 290, determining, based on the safety factor and/or a regional importance degree of the inspection region, a monitoring frequency of an environmental monitoring device and a supervisory equipment in the inspection region through a preset algorithm, and sending a control instruction corresponding to the monitoring frequency through the gas company sensor network platform to the gas equipment object platform.

For descriptions of the environmental monitoring device and the supervisory equipment, please refer to FIG. 1.

The regional importance degree refers to an indicator that reflects an importance of different inspection regions. The regional importance degree may be preset manually in advance. For ore descriptions of the regional importance degree, please refer to FIG. 4.

The monitoring frequency refers to data reflecting a monitoring cycle of the relevant monitoring device.

The preset algorithm refers to an algorithm for determining the monitoring frequency. The gas company management platform and/or the processor in the gas company management platform may preset the preset algorithm based on actual needs. For example, the preset algorithm may include that when a certain inspection region corresponds to a lower safety factor and a higher importance degree, the monitoring frequency of the environmental monitoring device and the supervisory equipment in the inspection region is higher.

The control instruction corresponding to the monitoring frequency refers to the instruction for adjusting the monitoring frequency. For example, the control instruction may include the monitoring device to be adjusted and a corresponding adjustment amplitude, etc. The gas equipment object platform may adjust the monitoring frequencies of the environmental monitoring device, and the supervisory equipment, etc. based on the control instruction.

In some embodiments, the gas company management platform and/or the processor in the gas company management platform may determine the foregoing monitoring frequency based on the mandatory machine inspection region, the region inspection type, the safety factor, and the regional importance degree of the inspection region by a preset algorithm.

In actual inspection, a plurality of inspection regions may start inspection together to ensure an inspection efficiency. To ensure a safety of the personnel during manual inspection, and to ensure an operation effect of the robot in the inspection region of high regional importance degree during inspection as well as an effect of later analysis thereof, it may be necessary to increase the monitoring frequencies of the environmental monitoring device and the supervisory equipment in some of the inspection regions. The increase the monitoring frequencies of the environmental monitoring device and the supervisory equipment in some inspection regions means that more data needs to be uploaded to the gas company sensor network platform at the same time, which may exceed a bandwidth of the data transmission, resulting in a delay in the data transmission, which is not conducive to the monitoring of the inspection region. There is therefore a need to increase an intensity of monitoring while ensuring that a total load of data transmission is within the bandwidth.

In some embodiments, the preset algorithm may be to first increase the monitoring frequency of the inspection region that is ready for inspection or is under inspection, and then to adaptively adjust the monitoring frequency of each inspection region (an amount of increase in the monitoring frequency of the inspection region with manual inspection is not adjusted). Specifically, the preset algorithm may prioritize to ensure the increase of the monitoring frequency of the inspection region that needs manual inspection, and then classify and/or adjust the other inspection regions in gradients. For example, the preset algorithm may be the algorithm implemented by the processor based on the following operations.

In S1, the processor may construct a monitoring feature vector based on the region inspection type, the safety factor, and the regional importance degree of the inspection region that is ready for inspection or is under inspection. The processor may construct a second vector database based on a historical region inspection type, a historical safety factor, and a historical regional importance degree in a historical record. The processor may determine the amount of increase in the monitoring frequency of each of the above inspection regions based on matched vectors by performing a vector match in the second vector database based on the monitoring feature vector.

In some embodiments, the lower the safety factor of the inspection region and the higher the regional importance degree, the greater the corresponding increase in the monitoring frequency. And with the same safety factor and the same regional importance degree, the inspection region that requires the manual inspection may have a greater amount of increase in the monitoring frequency compared to other inspection regions.

In S2, the processor may determine, based on transmission data generated by the adjusted monitoring frequency, whether the total load of data transmission exceeds the bandwidth. In response to that the total load of data transmission does not exceed the bandwidth, the monitoring frequency of each inspection region determined in operation S1 may be determined as the final monitoring frequency; in response to that the total load of data transmission exceeds the bandwidth, an adjustment amount of the monitoring frequency may be determined and operation S2.1 may be performed. The adjustment amount may be determined in various ways, such as preset manually.

In S2.1, the processor may decrease, based on the amount of adjustment, the monitoring frequency of the inspection region that is ready for inspection or is under inspection and whose regional importance degree is less than an adjustment threshold. After the adjustment, the total load may be calculated again and whether the bandwidth is exceeded may be determined. In response to that the bandwidth is not exceeded, the adjustment may be stopped, and the adjusted monitoring frequency in operation S2.1 may be determined as the final monitoring frequency; in response to that the bandwidth is exceeded, operation S2.2 may be performed. The adjustment threshold may be preset manually.

In S2.2, the processor may decrease, based on the amount of the adjustment, reduce the monitoring frequency of the inspection region that is not ready for inspection. The total load may be calculated again after the adjustment, and whether the bandwidth is exceeded may be determined. In response to that the bandwidth is not exceeded, the adjustment may be stopped, and the monitoring frequency adjusted in this operation may be determined as the final monitoring frequency; in response to that the bandwidth is exceeded, operation S2.3 may be performed;

In S2.3, the processor may decrease, based on the amount of the adjustment, the monitoring frequency of a corresponding inspection region that is ready for or under inspection and is of higher importance degree than the adjustment threshold. The total load may be calculated again after the adjustment, and whether the bandwidth is exceeded may be determined. In response to that the bandwidth is not exceeded, the adjustment may be stopped, and the monitoring frequency adjusted in this operation may be determined used as the final monitoring frequency; in response to that the bandwidth is exceeded, operation S2.1-S2.3 may be repeated until the total load of data transmission is below the bandwidth.

In each of the above operations, the processor may determine, by the inspection instruction and manual reporting information, the inspection region that is ready for inspection or is under inspection, and determine the rest of the inspection region as the inspection region that is not ready for inspection. The manual reporting information refers to the inspection information that is actively reported by the personnel before the inspection, e.g., the manual reporting information may include an inspection start time.

The preset algorithm performing different adjustments on the monitoring frequencies of environmental monitoring devices and the supervisory equipment in different inspection regions may prioritize the monitoring frequency of the inspection region for manual inspection while ensuring that the total load of transmission data generated by the monitoring frequency does not exceed the bandwidth. In this way, the monitoring frequency of the other different inspection regions may be approximately increased, which ensures an operational effectiveness of the robotic inspection and also increases a monitoring intensity to ensure a safety of the personnel.

By obtaining a variety of data related to inspection, so as to determine the region inspection type of different inspection regions. In this way, while consider the safety of inspection, the inspection effect may be increased, and the risk may be reduced. The processor may determine the target pipeline corridor region and the inspection instruction based on the regional planning data and send the target pipeline corridor region and the inspection instruction to the inspection robot, thus realizing an automated inspection planning for the underground pipeline corridor. The processor may reasonably adjust the monitoring frequency of each inspection region based on the monitoring frequencies of the environmental monitoring device and the supervisory equipment in the determined inspection region, so as to improve the monitoring intensity and inspection efficiency, and to ensure the inspection effect.

In some embodiments, the gas company management platform may also obtain inspection data through the gas company sensor network platform, and upload the inspection data to the government regulatory management platform when the government regulatory management platform issues a data instruction.

The inspection data refers to relevant data collected by the data acquisition device in the inspection robot. For example, the inspection data may include gas data of each inspection region, detection data of a partial discharge meter, image data captured by an optical camera, etc. For descriptions of the data collection device, please refer to FIG. 1.

In some embodiments, the gas company management platform may obtain, through the gas company sensor network platform, the inspection data collected by each data collection device from the gas equipment object platform and, upload the inspection data to the government regulatory management platform when the government regulatory management platform issues a data instruction. The data instruction refers to a request for obtaining data to the platform. In some embodiments, the data instruction may include a type of data requested as well as a time requirement.

By uploading the inspection data to the government regulatory management platform when the government regulatory management platform issues a data instruction, the interaction between the gas company and the government may be implemented, so that the government is able to carry out more direct monitoring and control on the information related to the inspection of the underground pipeline corridor.

It may be noted that the foregoing description of the process 200 is intended to be exemplary and illustrative only and does not limit the scope of application of the present disclosure. For those skilled in the art, various corrections and changes may be made to the process 200 under the guidance of the present disclosure. However, these corrections and changes remain within the scope of the present disclosure.

FIG. 3 is a schematic diagram illustrating an exemplary process for determining the mandatory machine inspection region according to some embodiments of the present disclosure.

As shown in FIG. 3, the gas company management platform may determine a safety factor 330 based on a region feature map 310 by a factor determination model 320; and determine a mandatory machine inspection region 332 based on the safety factor 330 and a preset machine inspection condition 331. For descriptions of the safety factor, and the mandatory machine inspection region, please refer to corresponding descriptions in FIG. 2.

The region feature map 310 refers to a graph reflecting features of each inspection region, which consists of a node and an edge.

The node of the region feature map may include an inspection region node and an emergency exit node. The inspection region node refers to a node that represents each inspection region.

In some embodiments, the node feature of the inspection region node may include region position data, region information data, environmental monitoring data, image data, gas monitoring data, a historical inspection record, etc. of the inspection region. For related descriptions of the above data, please refer to FIG. 2.

In some embodiments, the node feature of the emergency exit node may include an exit position, an exit size, etc. The node feature of the emergency exit node may be obtained through a government safety regulatory management platform.

The edge may exist between two nodes of the region feature map if there is a pipeline corridor connecting the two nodes. An edge feature may include a physical length, a width, etc. of the pipeline corridor corresponding to the edge, and if there is a gas pipeline in the pipeline corridor corresponding to the edge, the edge feature may also include pipeline distribution data and gas monitoring data for the gas pipeline. The pipeline distribution data refers to data reflecting the distribution of pipelines (e.g., a gas pipeline, a water pipeline, an electric circuit pipeline, etc.) in the corresponding pipeline corridor, e.g., a count of the pipeline, a position of the pipeline, etc. The pipeline distribution data may be obtained based on the government safety regulatory management platform.

In some embodiments, the node feature of the inspection region node in the region feature map may further include a region feature.

The region feature refers to data that reflects an inspection difficulty feature of each position in each inspection region. For descriptions of the region feature, please refer to FIG. 4.

By adding the region feature to the node feature of the inspection region node of the region feature map, the region feature map may more comprehensively reflect the feature of the respective inspection region, so as to make a subsequent safety factor determined based on the region feature map more reliable and more in line with an actual situation.

The factor determination model 320 refers to a model for determining the safety factor for each inspection region. In some embodiments, the factor determination model may be a machine learning model. For example, the factor determination model may be a neural network model, a deep neural network model, etc. An input to the factor determination model may include the region feature map, and an output may be the safety factor 330 for each inspection region.

In some embodiments, the factor determination model may be obtained by training based on a great count of factor training samples with sample labels. The factor training samples may include a sample region map, and the factor training samples may be obtained from a historical record. The sample labels may be actual safety factors corresponding to each inspection region node corresponding to the sample region map, and the sample labels may be manually labeled. The actual safety factor refers to the safety factor determined based on the actual historical record, and the actual safety factor may be determined as described later.

In some embodiments, the processor may input a great count of sample region maps into an initial factor determination model, construct a loss function based on the sample labels of the actual safety factors corresponding to the sample region map and the output of the initial factor determination model, and iteratively update the initial factor determination model based on the loss function. When a value of the loss function satisfies an iteration completion condition, the training of the initial factor determination model may be completed and a trained factor determination model may be obtained. The iteration completion condition may include that a loss function converges, a count of iterations reaches a threshold, etc.

In some embodiments, the gas company management platform may construct the sample region map from actual data. The factor training samples may include positive samples and negative samples, and a count of positive samples and a count of negative samples may satisfy a preset count condition.

The actual data refers to relevant data actually collected in the historical record. For example, the actual data may include the data related to the inspection region and the data related to the emergency exit actually collected in the history. The way of constructing the sample region map may be similar to the way of constructing the region feature map, which is referred to in the relevant description above.

The positive samples in the factor training samples refer to training samples whose sample map has at least one inspection region with a safety factor smaller than the preset factor threshold, i.e., samples likely to include a dangerous inspection region. The negative samples in the factor training samples refer to training samples whose sample map does not have the inspection region with the safety factor smaller than the preset factor threshold, i.e., samples where each inspection region is safe.

In some embodiments, when the sample label corresponding to the sample in the factor training samples has at least one inspection region with the safety factor smaller than the preset factor threshold, the sample may be determined to be the positive sample; when the sample label corresponding to the sample in the factor training samples does not have the inspection region with the safety factor smaller than the preset factor threshold, the sample may be determined to be the negative sample. The preset factor threshold may be manually preset.

In some embodiments, to make the factor training samples include a certain count of negative samples to ensure a generalizability of the factor determination model, the positive samples and the negative samples may need to satisfy a preset count condition.

The preset count condition refers to a condition that needs to be satisfied for the counts of the positive samples and the negative samples in the factor training samples. For example, the preset count condition may be that the count of positive samples in the factor training samples is higher than the count of negative samples, and a difference between the two does not exceed a preset count threshold. The preset count threshold may be determined based on a total count of samples, e.g., the higher the total count of samples, the higher the preset count threshold may be set.

In some embodiments, the actual safety factor corresponding to the sample region map may be determined based on a fine monitoring sequence actually collected for the inspection region, a shortest emergency response distance for the inspection region, and a gas monitoring sequence for the inspection region. The above data may be obtained from the historical record.

The fine monitoring sequence refers to a sequence consists of environmental monitoring data at a plurality of time points at a plurality of collection points of a data collection device during a collection time. In some embodiments, one inspection region corresponds to a fine monitoring sequence, which is collected and obtained by a data collection device mounted on the inspection robot during the inspection.

The collection points refer to a plurality of positions in the inspection region. The collection time may not be less than an average inspection duration, which is determined by a time of historical manual inspection (e.g., an average of the historical manual inspection duration) or may be manually preset.

Compared to the environmental monitoring data, the fine monitoring sequence may reflect the environmental monitoring data of a plurality of dense collection points in each inspection region, which more effectively reflects the actual situation in each inspection region.

For contents of the data collection device, the environmental monitoring device, and the inspection robot, please refer to FIG. 1. For contents of the environmental monitoring data, please refer to FIG. 2.

The shortest emergency distance refers to a length of the shortest route from the inspection region to the nearest emergency exit.

The gas monitoring sequence refers to a sequence consists of the gas monitoring data of the gas pipelines in each inspection region for a preset time. The preset time may not be less than the average inspection duration, and may be preset manually.

In some embodiments, the gas company management platform may determine an air quality corresponding to each inspection region by a preset rule based on the fine monitoring sequence of each inspection region corresponding to the factor training samples. For example, the preset rule may be that for a particular inspection region, the more points in the fine monitoring sequence that do not meet a safety standard, the lower the air quality of the inspection region. The safety standard may be that an average oxygen content, a gas content, a dust content, etc. at the point is below a threshold. The threshold may be preset by a technician.

In some embodiments, the gas company management platform may determine the actual safety factor of each inspection region in various ways based on the air quality, the shortest emergency response distance, and the gas monitoring sequence of each inspection region corresponding to the factor training sample. For example, the higher the air quality, the shorter the shortest emergency response distance, the more stable the gas monitoring data of the inspection region, and the lower a historical actual frequency of failures and/or casualties in the inspection region, the higher the actual safety factor of the inspection region. The historical actual frequency of failures and/or casualties may be obtained through the government safety regulatory management platform.

A stability degree of the gas monitoring sequence indicates the degree of stability of the gas monitoring data in the gas monitoring sequence. The stability degree of the gas monitoring sequence may be determined by a variance of the gas monitoring sequence.

By constructing the sample region map based on actual data and dividing the samples into the positive samples and the negative samples, so that the positive samples and the negative samples satisfy the preset count condition, the factor determination model may be trained to find out a region with a low safety factor more easily, and at the same time, a generalizability of the model may be ensured. By setting the sample labels as the actual safety factor, the trained factor determination model may be more accurate and realistic.

The preset machine inspection condition 331 refers to the condition used to determine the region inspection type. For example, the preset machine inspection condition may be determining the inspection region with the safety factor below a safety threshold as the mandatory machine inspection region.

In some embodiments, the safety thresholds corresponding to different inspection regions may be different. The preset machine inspection condition as well as the safety thresholds may be preset manually.

In some embodiments, the preset machine inspection condition may be determined based on the historical inspection record, historical fault data, and an inspection duration of the inspection region. For contents on the historical inspection record, please refer to FIG. 2.

The historical fault data refers to data related to faults in the history record. For example, the historical fault data may include a type of failure (an equipment failure, a gas leak, etc.), a time of failure, a position of failure, etc., when the failure occurred historically. The historical fault data may be obtained through a data storage center.

The inspection duration refers to an estimated time to complete an inspection in the inspection region. The processor may estimate the inspection duration for each inspection region based on relevant historical record.

In some embodiments, the processor may determine the safety threshold in the preset machine inspection condition in various ways. For example, the processor may construct an inspection feature vector based on the historical fault data, the historical inspection record, and the inspection duration of the inspection region, match the inspection feature vector in a third vector database, take one or more third reference vectors whose similarities are greater than a similarity threshold as target vectors, and. perform a weighted average on the reference threshold corresponding to the target vectors and taken as the safety threshold.

The inspection feature vector refers to a vector to be matched, the third vector database may include the third reference vector and the corresponding reference threshold, the third reference vector may consist of actual relevant data in the historical record, and the corresponding reference threshold may be determined based on the historical actual failure condition and the historical inspection duration. For example, if a certain inspection region often has gas leaks and other faults that causes safety problems, or if the inspection duration is longer for each inspection of the region, a higher reference threshold may be set. A weight of the weighting may be determined based on the similarity between each inspection feature vector and one or more target vectors matched to it.

By determining the preset machine inspection condition based on the historical inspection record of the inspection region, the historical fault data, and the inspection duration, the setting of the preset machine inspection condition may be more informative, which in turn makes the determined mandatory machine inspection region more reasonable and ensures the safety of the workers.

In some embodiments, the gas company management platform may determine the inspection region that satisfies the preset machine inspection condition as the mandatory machine inspection region 332.

The inspection region with a lower safety factor or a longer shortest emergency response distance may be classified as the mandatory machine inspection region. The inspection region with a high regional importance degree that is unable to be monitored by the robot, as well as the inspection region with a poorer monitoring effect of robotic inspection may be classified as the inspection region for manual inspection or for comprehensive inspection. For the manual inspection, the safety of maintenance personnel must be ensured. Therefore, for the inspection region with a lower safety factor (i.e., greater degree of danger), robots may be used for inspection (i.e., determined as the mandatory machine inspection region) to prevent casualties during the maintenance inspection. By determining the safety factor through the factor determination model based on the region feature map, a more reasonable safety factor may be determined in combination with the features of the inspection region; by determining the mandatory machine inspection region based on the safety factor and the preset machine inspection condition, a more reasonable mandatory machine inspection region may be determined in combination with the preset machine inspection condition, thereby improving the inspection efficiency and decrease the manual inspection.

FIG. 4 is a schematic diagram illustrating an exemplary inspection evaluation model according to some embodiments of the present disclosure.

In some embodiments, as shown in FIG. 4, a gas company management platform may determine a region feature 430 based on region information data 411 and image data 412 through a feature extraction layer 421 of an inspection evaluation model 420; determine an inspection evaluation result 450 based on the region feature 430, a historical inspection record 441, pipeline distribution data 442, and regional equipment data 443 through the inspection evaluation layer 422; and determine a region inspection type 460 based on the inspection evaluation result 450. For related descriptions of the region information data 411, the image data 412, the historical inspection record 441, and the region inspection type 460, please refer to detailed descriptions in FIG. 2.

The inspection evaluation model 420 refers to a model used to determine the inspection evaluation result. The inspection evaluation result refers to evaluation data used to indicate a manual inspection and a robotic inspection. In some embodiments, the inspection evaluation result may be expressed in various ways. For example, the inspection evaluation result may be expressed by a score. In some embodiments, the inspection evaluation result may include a human inspection evaluation result for the manual inspection and a machine inspection evaluation result for the robotic inspection. The human inspection evaluation result and the robotic inspection result may be indicated by a human inspection score and a machine inspection score, respectively. In some embodiments, the human inspection score and the machine inspection score may be expressed in various ways, such as by specific numerical values. The inspection evaluation model may be a machine learning model. For example, the inspection evaluation model may be any one or combination of a neural network model, a convolutional neural network model, a deep neural network model, etc.

In some embodiments, the inspection evaluation model 420 may include the feature extraction layer 421 and the inspection evaluation layer 422. In some embodiments, the feature extraction layer may be the convolutional neural network model and the inspection evaluation layer may be the neural network model.

In some embodiments, the feature extraction layer 421 may be used to obtain the region feature. An input to the feature extraction layer 421 may include the region information data and the image data for a remaining region, and an output may include the region feature of the remaining region.

The region feature may indicate an inspection difficulty of the robotic inspection or the manual inspection. For example, the more regional devices in the inspection region, the smaller the region, etc., the greater the inspection difficulty of the inspection region. For descriptions of the region feature, please refer to FIG. 3.

In some embodiments, the feature extraction layer 421 may be obtained by training a great count of first training samples with first labels. Each group of training samples in the first training samples may include sample inspection region information and sample image data for the sample inspection region. The first label may be an actual region feature of the sample inspection region corresponding to each group of training samples.

In some embodiments, the first training sample may be obtained through historical data, and the first label may be obtained in various ways, e.g., the first label may be labeled based on the results of the manual inspection and the robotic inspection actually performed. For example, the result may be that during the actual manual inspection, a certain position of the sample inspection region is determined to be too narrow to be detected. For another example, the result may be that the robotic inspection feeds back that a region of the sample inspection region is too cluttered to be detected. The actual region feature of the sample inspection region may be manually labeled based on the above results.

The model training process for the feature extraction layer may be similar to that for the factor determination model, which is referred to in FIG. 3.

In some embodiments, the inspection evaluation layer 422 may be used to determine the inspection evaluation result for the machine learning model. An input to the inspection evaluation layer 422 may include the region feature of the remaining region, the pipeline distribution data, the regional equipment data and the historical inspection record, and an output may include the inspection evaluation result. For contents on the pipeline distribution data, please refer to FIG. 3.

The regional equipment data refers to data related to at least one gas equipment included in each remaining region. The regional equipment data for the each remaining region may be obtained through a data storage center.

In some embodiments, the inspection evaluation layer 422 may be obtained by training a great count of second training samples with second labels. Each group of training samples in the second training sample may include a sample region feature, sample pipeline distribution data, sample regional equipment data, and a sample historical inspection record of the sample inspection region. The second label may be an actual inspection evaluation result (an actual human inspection score and an actual machine inspection score) for the sample inspection region corresponding to each group of training samples.

In some embodiments, the second training sample may be obtained through the historical data. The second label may be obtained in various ways. For example, the second label may be obtained by actually dispatching the worker and the robot to enter the sample inspection region for inspection, respectively, scoring the inspection result, and labeling the sample inspection region based on the foregoing scoring. A criteria for scoring the inspection result may be set by those skilled in the art. For example, the criteria for scoring may be related to a completion degree of the inspection of the sample inspection region. In some embodiments, the higher the completion degree of the inspection and the more accurate the inspection data, the higher the actual human inspection score and the actual machine inspection score of the corresponding inspection result.

The model training process for the inspection evaluation layer may be similar to that for the factor determination model, which is referred to in FIG. 3.

In some embodiments, the gas company management platform may determine the inspection evaluation result for each remaining region based on the inspection evaluation model. The gas company management platform may determine the inspection evaluation result for the remaining region in various ways. For example, the gas company management platform may compare the human inspection score and the machine inspection score based on the scoring of the inspection evaluation result, and determine the inspection type corresponding to a high score as the region inspection type of the remaining region.

By obtaining the inspection evaluation result of each remaining region through the inspection evaluation model, and determining the region inspection type of each remaining region according to the inspection evaluation result, an accuracy of the determined region inspection type may be further improved. As a result, an accurate allocation of inspection resource may be implemented, a better inspection effect of each remaining region may be achieved, so as to prevent the workers from working in dangerous regions and avoid safety accidents. By rationally allocating manpower and robots, resources may be fully utilized, an efficiency of pipeline supervision may be improved, risks and losses caused by failures may be reduced, and the gas safety of a user may be better guaranteed.

In some embodiments, the gas company management platform may determine that the region inspection type is the robotic inspection in response to that the human inspection evaluation result and the machine inspection evaluation result satisfy a preset discrepancy condition. The preset discrepancy condition may be determined based on the safety factor.

The preset discrepancy condition refers to a condition preset for making a discrepancy determination between the human inspection evaluation result and the machine inspection evaluation result. The preset discrepancy condition may include a safety difference. For example, the preset discrepancy condition may be that the human inspection score is greater than the machine inspection score, and that the difference between the human inspection score and the machine inspection score is less than the safety difference. In some embodiments, the safety difference in the preset discrepancy condition may be determined by those skilled in the art checking a preset table. In some embodiments, a value of the safety difference in the preset table may be constructed based on the safety factor and according to a construction rule. For example, the construction rule may be that the greater the safety factor, the smaller the safety difference. More descriptions of the region inspection type and the safety factor can be found in FIG. 2.

In some embodiments, in response to that the human inspection evaluation result and the machine inspection evaluation result satisfy the preset discrepancy condition, the gas company management platform may determine that the region inspection type is the robotic inspection.

By preset the discrepancy condition, the accuracy of the determined region inspection type may be further improved, so as to ensure that the robotic inspection is used as much as possible in the region with a high risk, and that the manual inspection is used in the region of high regional safety. In this way, a personal safety of the inspection personnel may be guaranteed, and an efficiency of the inspection may be improved.

In some embodiments, in response to that a regional importance degree of the remaining region satisfies a preset importance condition and that the inspection evaluation result satisfies a preset evaluation condition, the gas company management platform may determine that the region inspection type of the remaining region is a comprehensive inspection. The regional importance degree of the remaining region may be determined based on a pipeline importance degree of the remaining region and population data.

The regional importance degree of the remaining region refers to an indicator used to indicate an importance of different remaining region. In some embodiments, the regional importance degree of the remaining region may be determined by a weighted calculation of the pipeline importance degree and the population data. In some embodiments, the pipeline importance degree, the population data, and the regional importance degree of the remaining region may be positively correlated, i.e., the higher the pipeline importance degree and the greater the population data, the higher the regional importance degree of the remaining region. More descriptions of the population data can be found in FIG. 2.

The pipeline importance degree refers to data used to indicate the importance degree of a gas pipeline. In some embodiments, the gas company management platform may construct a pipeline map based on pipeline routes, and determine the pipeline importance degree of different remaining regions by calculating nodes in the pipeline map.

The pipeline map refers to a map reflecting a structure and a relationship of the pipeline. In some embodiments, the gas company management platform may construct the pipeline map based on the pipeline routes. The pipeline map may include nodes and edges. The node may include a user node and a pipeline node, and the edge may be used to connect two nodes. The user node may be a node used to indicate the user, and the pipeline node may be a node used to indicate the pipeline.

In some embodiments, the pipeline importance degree may be determined based on a weighted summation of the importance degrees of the users corresponding to user nodes of all routes in a certain remaining region. A weighting factor may be a route factor in the pipeline map, the greater the route factor, the higher the pipeline importance degree. The route factor may be positively correlated to a route length, and the route factor may be determined manually or by presetting. The route length refers to a proximity of a start node to an end node of the route. The proximity refers to a count of nodes that the route needs to pass through in the pipeline map to reach from one node to another node, and the route needs to be able to be reached in a direction of the edge, and there may be a plurality of routes. The greater the length of the route, the more the node affects subsequent nodes on the route, and the greater the route factor.

In some embodiments, the importance degree of the user may be determined by a weighted summation of a gas usage of the user, a duration of gas use of the user, and a probability of paying the bill on time. The each factor of the weighted summation may be empirically preset. In some embodiments, the importance degree of the user may be positively correlated with the gas usage of the user, the duration of gas use of the user, and the probability of paying the bill on time. The gas usage of the user, the duration of gas use of the user, and the probability of paying the bill on time may be obtained based on a data storage center.

The preset importance condition refers to a condition preset for determining the importance of a region. For example, the preset importance condition may be that the regional importance degree of the remaining region is greater than an importance threshold. The importance threshold may be used to indicate a limit value for the importance degree, which is obtained by manual setting. The preset evaluation condition may be the condition preset for assessing a need for a comprehensive inspection. For example, the preset evaluation condition may be that the difference between the human inspection score and the machine inspection score for the remaining region is less than a selection threshold. The selection threshold may be used to indicate a limit value for scoring the difference between the human inspection score and the machine inspection score, which is obtained by manual setting. The preset importance condition and the preset evaluation condition may be preset.

The comprehensive inspection refers to a combination of the manual inspection and the robotic inspection. The comprehensive inspection may be accomplished in various ways. For example, the comprehensive inspection corresponding to the inspection region may be performed by the manual inspection alternating with the robotic inspection.

In some embodiments, the gas company management platform may determine that the region inspection type is the comprehensive inspection in response to determining that the regional importance degree of the remaining region satisfies the preset importance condition and that the inspection evaluation result satisfies the preset evaluation condition.

In response to a fact that the regional importance degree of the remaining region satisfies the preset importance condition, and the inspection evaluation result satisfies the preset evaluation condition, the comprehensive inspection may be used to carry out the inspection, which fully combines strengths and weaknesses of the two inspection types to play a complementary role, and to complete the inspection more efficiently. At the same time, the inspection effect of the inspection region may be ensured while reducing a waste of inspection resources.

Some embodiments of the present disclosure further provide a non-transitory computer-readable storage medium storing computer instructions, wherein when reading the computer instructions in the storage medium, a computer implements the method for safe maintenance of an underground pipeline corridor based on a smart gas regulatory IoT The basic concepts have been described above, and it is apparent to those skilled in the art that the foregoing detailed disclosure serves only as an example and does not constitute a limitation of the present disclosure. While not expressly stated herein, various modifications, improvements, and amendments may be made to the present disclosure by those skilled in the art. Those types of modifications, improvements, and amendments are suggested in the present disclosure, so those types of modifications, improvements, and amendments remain within the spirit and scope of the exemplary embodiments of the present disclosure.

Finally, it should be understood that the embodiments described in the present disclosure are only used to illustrate the principles of the embodiments of the present disclosure. Other deformations may also fall within the scope of the present disclosure. As such, alternative configurations of the embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for safe maintenance of an underground pipeline corridor based on smart gas regulatory Internet of Things (IoT), wherein the method is executed by a gas company management platform of a system for safe maintenance of the underground pipeline corridor based on the smart gas regulatory IoT, the method comprises:
   obtaining, through a data storage center, an inspection region of an underground pipeline corridor, region position data, region information data, and a historical inspection record corresponding to the inspection region, the region information data including a size, an area, and a spatial shape of the inspection region;
   obtaining, from a gas equipment object platform, environmental monitoring data, image data, and gas monitoring data of the inspection region via a gas company sensor network platform;
   obtaining, through a government regulatory management platform, population data;
   determining a safety factor for the inspection region based on the environmental monitoring data, the image data, the gas monitoring data, and the region position data;
   determining, based on the safety factor, a mandatory machine inspection region in the inspection region;
   determining a region inspection type for a remaining region in the inspection region based on the region information data, the historical inspection record, and the population data, the region inspection type including a robotic inspection and a manual inspection; wherein
   the determining the region inspection type for the remaining region in the inspection region based on the region information data, the historical inspection record, and the population data includes:
      determining a region feature based on the region information data and the image data through a feature extraction layer of an inspection evaluation model, the inspection evaluation model including the feature extraction layer and an inspection evaluation layer, and the inspection evaluation model being a machine learning model;
      determining an inspection evaluation result based on the region feature, the historical inspection record, pipeline distribution data, and regional equipment data through the inspection evaluation layer; and
      determining the region inspection type based on the inspection evaluation result; wherein
   the inspection evaluation result includes a human inspection evaluation result and a machine inspection evaluation result, the method further includes:
   in response to determining that the human inspection evaluation result and the machine inspection evaluation result satisfy a preset discrepancy condition, determining that the region inspection type is the robotic inspection, the preset discrepancy condition being determined based on the safety factor;
   generating regional planning data based on the mandatory machine inspection region and the region inspection type of the remaining region;
   determining a target pipeline corridor region and an inspection instruction based on the regional planning data, and sending the target pipeline corridor region and the inspection instruction to an inspection robot; and
   determining, based on the safety factor and/or a regional importance degree of the inspection region, a monitoring frequency of an environmental monitoring device and a supervisory equipment in the inspection region through a preset algorithm, and sending a control instruction corresponding to the monitoring frequency through the gas company sensor network platform to the gas equipment object platform, wherein the gas equipment object platform adjusts the monitoring frequency based on the control instruction.

2. The method of claim 1, wherein the method further includes:
determining the safety factor through a factor determination model based on a region feature map, the factor determination model being a machine learning model; and
determining the mandatory machine inspection region based on the safety factor and a preset machine inspection condition.

3. The method of claim 1, wherein the method further includes:
in response to determining that the regional importance degree of the remaining region satisfies a preset importance condition and the inspection evaluation result satisfies a preset evaluation condition, determining that the region inspection type is a comprehensive inspection, wherein the regional importance degree of the remaining region is determined based on a pipeline importance degree of the remaining region and the population data.

4. The method of claim 1, wherein the method further includes:
determining the monitoring frequency through the preset algorithm based on the mandatory machine inspection region, the region inspection type, the safety factor, and the regional importance degree of the inspection region.

5. A system for safe maintenance of an underground pipeline corridor based on smart gas regulatory Internet of Things (IoT), wherein the system includes a government regulatory management platform, a government regulatory sensor network platform, a government regulatory object platform, a gas company sensor network platform and a gas equipment object platform; the government regulatory management platform includes a government gas regulatory management platform and a government safety regulatory management platform; the government regulatory sensor network platform includes a government gas regulatory sensor network platform and a government safety regulatory sensor network platform;
the government regulatory object platform includes a gas company management platform, and the gas company management platform is configured to:
obtain, through a data storage center, an inspection region of an underground pipeline corridor, region position data, region information data, and a historical inspection record corresponding to the inspection region;
obtain, through a gas equipment object platform, environmental monitoring data, image data and gas monitoring data of the inspection region via a gas company sensor network platform;
obtain, through a government regulatory management platform, population data;
determine a safety factor for the inspection region based on the environmental monitoring data, the image data, the gas monitoring data, and the region position data;
determine, based on the safety factor, a mandatory machine inspection region in the inspection region;
determine a region inspection type of a remaining region in the inspection region based on the region information data, the historical inspection record, and the population data, the region inspection type including a robotic inspection and a manual inspection; wherein
the determining the region inspection type for the remaining region in the inspection region based on the region information data, the historical inspection record, and the population data includes:
determining a region feature based on the region information data and the image data through a feature extraction layer of an inspection evaluation model, the inspection evaluation model including the feature extraction layer and an inspection evaluation layer, and the inspection evaluation model being a machine learning model;
determining an inspection evaluation result based on the region feature, the historical inspection record, pipeline distribution data, and regional equipment data through the inspection evaluation layer; and
determining the region inspection type based on the inspection evaluation result; wherein
the inspection evaluation result includes a human inspection evaluation result and a machine inspection evaluation result, the method further includes:
in response to determining that the human inspection evaluation result and the machine inspection evaluation result satisfy a preset discrepancy condition, determining that the region inspection type is the robotic inspection, the preset discrepancy condition being determined based on the safety factor;
generate regional planning data based on the mandatory machine inspection region and the region inspection type of the remaining region;
determine a target pipeline corridor region and an inspection instruction based on the regional planning data, and send the target pipeline corridor region and the inspection instruction to an inspection robot; and
determine, based on the safety factor and/or a regional importance degree of the inspection region, a monitoring frequency of an environmental monitoring device and a supervisory equipment in the inspection region through a preset algorithm, and sending a control instruction corresponding to the monitoring frequency through the gas company sensor network platform to the gas equipment object platform, wherein the gas equipment object platform adjusts the monitoring frequency based on the control instruction.

6. The system of claim 5, wherein the gas company management platform is further configured to:
determine the safety factor through a factor determination model based on a region feature map, the factor determination model being a machine learning model; and
determine the mandatory machine inspection region based on the safety factor and a preset machine inspection condition.

7. The system of claim 5, wherein the gas company management platform is further configured to:
in respond to determining that the regional importance degree of the remaining region satisfies a preset importance condition and the inspection evaluation result satisfies a preset evaluation condition, determine that the region inspection type is a comprehensive inspection, wherein the regional importance degree of the remaining region is determined based on a pipeline importance degree of the remaining region and the population data.

8. The system of claim 5, wherein the gas equipment object platform further includes the environmental monitoring device, the supervisory equipment, the inspection robot, and a pipeline monitoring device, and the gas company management platform further includes a processor; wherein the environmental monitoring device is deployed in the underground pipeline corridor and is configured to obtain the environmental monitoring data, and upload the environmental monitoring data to the gas company sensor network platform via the gas equipment object platform;

the supervisory equipment is deployed in the underground pipeline corridor and is configured to obtain the image data and upload the image data to the gas company sensor network platform via the gas equipment object platform;

the pipeline monitoring device is deployed within a gas pipeline and is configured to obtain the gas monitoring data and upload the gas monitoring data to the gas company sensor network platform via the gas equipment object platform;

the inspection robot is deployed in the underground pipeline corridor, and is configured to perform inspections and collect inspection data within the underground pipeline corridor, and upload the inspection data to the gas company sensor network platform;

the processor is configured to:

determine, based on the regional planning data, the target pipeline corridor region and the inspection instruction, and control the inspection robot to inspect the target pipeline corridor region based on the inspection instruction; and determine the monitoring frequency based on the safety factor and/or the regional importance degree of the inspection region through the preset algorithm, and send the control instruction to the gas equipment object platform via the gas company sensor network platform, and the gas equipment object platform adjusts the monitoring frequency based on the control instruction.

* * * * *